United States Patent
Sheth et al.

(10) Patent No.: US 12,187,316 B2
(45) Date of Patent: Jan. 7, 2025

(54) CAMERA CALIBRATION FOR UNDEREXPOSED CAMERAS USING TRAFFIC SIGNAL TARGETS

(71) Applicant: GM Cruise Holdings LLC, San Francisco, CA (US)

(72) Inventors: Himil Narayan Sheth, San Francisco, CA (US); Zhizhong Yan, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 229 days.

(21) Appl. No.: 17/859,680

(22) Filed: Jul. 7, 2022

(65) Prior Publication Data

US 2024/0010233 A1    Jan. 11, 2024

(51) Int. Cl.
*B60W 60/00* (2020.01)
*G06V 20/58* (2022.01)

(52) U.S. Cl.
CPC ....... *B60W 60/0015* (2020.02); *G06V 20/584* (2022.01); *B60W 2420/403* (2013.01)

(58) Field of Classification Search
None
See application file for complete search history.

(56) References Cited

U.S. PATENT DOCUMENTS

| | | | | |
|---|---|---|---|---|
| 9,779,315 | B2 * | 10/2017 | Yamanoi | G06T 7/70 |
| 10,187,629 | B2 * | 1/2019 | Cabral | H04N 13/243 |
| 10,884,424 | B2 * | 1/2021 | Creusot | G05D 1/249 |
| 2022/0114888 | A1 * | 4/2022 | Napanda | G08G 1/0112 |
| 2023/0021591 | A1 * | 1/2023 | Hamajima | B60W 40/12 |
| 2023/0145561 | A1 * | 5/2023 | Miao | G06T 7/80 |
| | | | | 382/100 |
| 2023/0154200 | A1 * | 5/2023 | Gong | G06V 20/584 |
| | | | | 345/419 |
| 2023/0175863 | A1 * | 6/2023 | Kitahara | G01C 21/3885 |
| | | | | 701/400 |
| 2023/0206608 | A1 * | 6/2023 | Eldar | G06V 20/588 |
| | | | | 701/28 |

FOREIGN PATENT DOCUMENTS

CN    112766026 A  *  5/2021  ........... G06V 20/582

OTHER PUBLICATIONS

Machine translation of specification of Anonymous (CN-112766026-A), 2021 (Year: 2021).*

* cited by examiner

*Primary Examiner* — Todd Melton
*Assistant Examiner* — Sarah A. Mueller

(57) ABSTRACT

The present technology pertains to determining whether traffic signal cameras of an AV are miscalibrated. One technique for determining if a given traffic signal camera is miscalibrated includes obtaining an image from a traffic signal camera, marking the location of a traffic signal in the image with a bounding box, and determining if the light sources of the traffic signal are within the bounding box. If not, an alternate reason check is performed to determine whether an alternate reason exists for why the light source of the traffic signal is not within the bounding box. If no such reason exists, then the traffic signal camera may be miscalibrated. An additional calibration check may be performed using images from two traffic signal cameras of the AV each having four common light sources, and performing a homographic computation using the location of the light sources in the images.

15 Claims, 7 Drawing Sheets

CAMERA CALIBRATION FOR UNDEREXPOSED CAMERAS USING TRAFFIC SIGNAL TARGETS

TECHNICAL FIELD

The subject matter of this disclosure relates in general to the field of autonomous vehicles (AVs), and more particularly, to systems and methods for detecting miscalibration of traffic signal cameras of AVs.

BACKGROUND

An Autonomous Vehicle (AV) is a motorized vehicle that can navigate without a human driver. The AV can include a plurality of sensor systems, such as a camera system, a Light Detection and Ranging (LIDAR) system, a Radio Detection and Ranging (RADAR) system, and so on. The AV may operate based upon sensor signal output of the sensor systems. For example, the sensor signals can be provided to a local computing system in communication with the plurality of sensor systems, and a processor can execute instructions based upon the sensor signals to control one or more mechanical systems of the AV, such as a vehicle propulsion system, a braking system, a steering system, and so forth.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
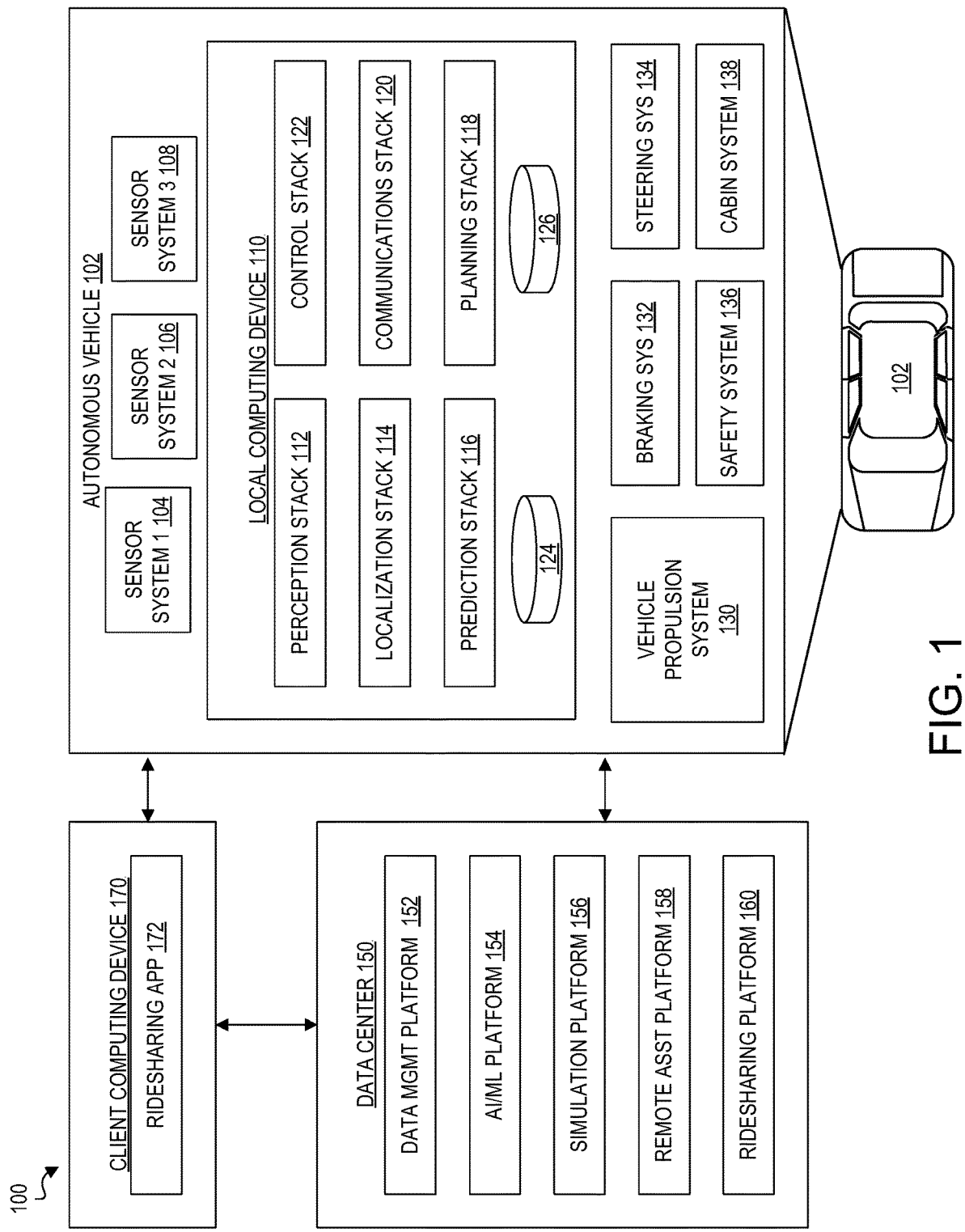
FIG. 1 illustrates an example of a system for managing one or more Autonomous Vehicles (AVs) in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In general, embodiments described herein relate to systems, methods, and instructions on non-transitory computer-readable media for detecting miscalibration of traffic signal cameras of AVs. Traffic signal cameras of an AV may be configured to capture images of an environment near an AV so that traffic signals may be identified and, if necessary, responded to by the AV. As an example, identification of a traffic signal with a red light on may cause the AV to stop appropriately at an intersection controlled by the traffic signal. As another example, an intersection tagged as a permissive left turn may indicate that it is legal for the AV to turn left on a solid green traffic signal light so long as the AV yields to any oncoming traffic (e.g., other vehicles, pedestrians, etc.). In order to perform correct actions in view of the light state (e.g., red, green, yellow, flashing, solid, etc.) of a traffic signal, an AV may use traffic signal cameras and other sensors and computing resources to identify the location and state of traffic signals in the environment of an AV. In one or more embodiments, such traffic signal cameras must be properly calibrated in order to allow the AV to identify traffic signals. One or more embodiments described herein address potential problems with traffic signal camera calibration by detecting miscalibration, and, in some instances, initiating appropriate actions in response to detected miscalibration of traffic signal cameras.

In one or more embodiments, images from traffic signal cameras are processed by computing resources available to the AV, which may be local (e.g., a local computing device) or remote (e.g., data center computing resources accessed via a network). Such images may be intentionally underexposed so that, while much of the image is relatively dark, and other objects are not clear, objects projecting light, such as traffic signals, are discernable. In one or more embodiments, processing such images includes marking the location of a traffic signal in the image with a bounding box around the traffic signal. In one or more embodiments, when a traffic signal camera of an AV is properly calibrated, the bounding box is around the traffic signal, and light sources (e.g., light bulbs) of the traffic signal are identifiable within the bounding box. Conversely, a light source of a traffic signal being outside the bounding box (or not in the center of the bounding box) for the traffic signal may indicate that the traffic signal camera is miscalibrated. Accordingly, one or more embodiments described herein detect miscalibration of traffic signal cameras by determining whether light sources of a traffic signal in an environment of an AV are within the bounding box associated with the traffic signal in an image obtained by the traffic signal camera of the AV.

Certain reasons may exist that lead to an AV expecting that a traffic signal camera image will include a traffic signal, but the image does not. As an example, map data available to the AV may indicate that a particular intersection should have a traffic light, but the traffic light does not appear in an image captured by the traffic signal camera of the AV as the AV approaches the intersection. In such a scenario, the AV may be configured to perform an alternate reason check to determine if an alternate reason exists for the traffic signal not appearing in the image. As an example, the AV may obtain an image from a different sensor of the AV, such as an object camera (i.e., a camera configured with a normal exposure level intended to assist in identifying objects near an AV), in order to determine whether the traffic signal is occluded (e.g., by a large truck between the AV and the traffic signal). In one or more embodiments, when a determination is made that there is a valid alternate reason for the traffic signal not appearing as expected in an image captured by a traffic signal camera, the image may be discarded from a set of images being used by the AV to detect possible miscalibration of the traffic signal camera.

Additionally, certain reasons may exist that lead to an image obtained via a traffic signal camera of an AV being processed and marked with a bounding box for a traffic signal, but the light sources (e.g., light bulbs) of the traffic signal are not within the bounding box. Such alternate reasons may include, but are not limited to: occlusion of the light sources (e.g., by flying objects, rain or other obstruction on or near the traffic light camera or traffic signal, etc.); the orientation of the traffic signal relative to the AV; and/or the distance from the traffic signal to the traffic signal being too large or too small. In one or more embodiments, such reasons preclude a determination of whether or not a traffic signal camera is properly calibrated. As such, the images may be discarded from a set of one or more images used to determine if a traffic signal is miscalibrated.

In one or more embodiments, if no alternate reasons exist for an image that is marked with a bounding box for a traffic signal having light sources of the traffic signal being outside of the bounding box, the traffic signal may be miscalibrated. A traffic signal may be considered miscalibrated after one instance of light source(s) of a traffic signal appearing outside the bounding box, or after a certain threshold quantity (e.g., fifteen) such instances, which may be referred to as a miscalibration quantity threshold.

In one or more embodiments, when a miscalibration of a traffic signal camera is detected, an indication of the miscalibration is generated. Such an indication may be provided to any relevant entity, such as to a local computer system of the AV, to remote computing resources, to an AV passenger, etc. Such an indication may be presented to any combination of such entities, for any number of purposes. In one or more embodiments, the receipt of such an indication initiates a calibration action. A calibration action may include the AV initiating a safe stop procedure, where the AV maneuvers safely to a stop, after which the traffic signal camera for which the indication was generated may be recalibrated. Recalibration may include adjusting any position, orientation, settings, etc. of the traffic signal camera. A calibration action may include performing real-time recalibration of the traffic signal camera while the AV otherwise continues to operate. Other actions may be considered calibration actions without departing from the scope of embodiments described herein.

Additionally, in one or more embodiments, an AV may include more than one traffic signal camera. In such scenarios, additional calibration detection may be performed. Such additional calibration detection may include performing homographic computations for any two or more cameras viewing the same environment. Homographic computations may require at least four light sources in the images from each camera, to serve as points in the images (which represent a geometric plane) for which homographic computation may be performed using a homography matrix along with the locations of the at least four points in each of the at least two images. In one or more embodiments, the four or more points serve as reference points in a two dimensional plane of each image that correspond to the same real-world light sources being viewed independently by the at least two traffic signal cameras.

In one or more embodiments, homographic computation is performed to determine the relative rotation and translation of the two cameras for which the computation is performed (i.e., the positions of the cameras relative to one another). Rotation information and translation information obtained via the homographic computation may be compared to expected values to determine if the physical positioning of the cameras is incorrect, which is a form of miscalibration. In one or more embodiments, the positioning of the cameras is incorrect when it differs from the expected positioning of the cameras. In one or more embodiments, the traffic signal cameras of the AV have expected positions to allow the AV to properly identify traffic signals, which is necessary for the AV to operate properly (e.g., safely navigate).

In one or more embodiments, the rotation information and translation information may be at least part of a calibration value for the two cameras. In one or more embodiments, the amount of difference in the calibration value for the two cameras, and an expected calibration value for the two cameras may indicate an amount of miscalibration. The two cameras may be considered miscalibrated when any mismatch exists between the calibration value and the expected calibration value. Additionally or alternatively, the difference may need to exceed a miscalibration threshold before the two cameras are considered to be miscalibrated.

In one or more embodiments, when the comparison of the calibration value and the expected calibration value indicates a miscalibration of the two cameras, a calibration action may be performed. The calibration action may include, but is not limited to, causing the AV to maneuver to a safe stop, causing the AV to exit from a fully autonomous mode, and/or recalibrating the two cameras in real-time as the AV continues to operate autonomously.

End of Overview

FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

In one or more embodiments, a camera system of the AV 102 may include any number of cameras of any type. As an example, the camera system may include two traffic signal cameras and at least one object camera. In one or more embodiments, a traffic signal camera is a camera that is configured to capture images used in identifying the position and state of traffic signals while the AV navigates. The state of a traffic signal may refer to which of the light sources of the traffic are powered on at a given time and/or the pattern being projected from the light sources (e.g., solidly on, flashing, etc.). In one or more embodiments, a traffic signal camera may be intentionally configured to produce underexposed images in which much of the image content is obscured (e.g., relatively dark) while light sources in the image stand out clearly. In one or more embodiments, an object camera is a camera that includes a relatively normal exposure level (e.g., similar to that perceived by a human eye) and is used to identify objects (e.g., other vehicles, pedestrians, obstructions, buildings, signs, etc.) in the environment of an AV.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, states (e.g., the color of a light projected from a traffic signal), speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view (i.e., occluded), and so forth. In some embodiments, an output of the prediction stack can be a bounding area (which may be referred to as a bounding box) around a perceived object that can be associated with a semantic label that identifies the type of object (e.g., a traffic signal) that is within the bounding area, the kinematic of the object (information about its movement), a tracked path of the object, a description of the pose of the object (its orientation or heading, etc.), and/or the state of the object (e.g., a traffic signal projecting a red light, green light, yellow light, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. As another example, the AV 102 can use map information to determine that the one or more cameras of the AV 102 should see one or more traffic signals at a given intersection encountered by the AV 102. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer (e.g., including the locations of traffic signals), and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data (e.g., from traffic signal cameras, object cameras, etc.), RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
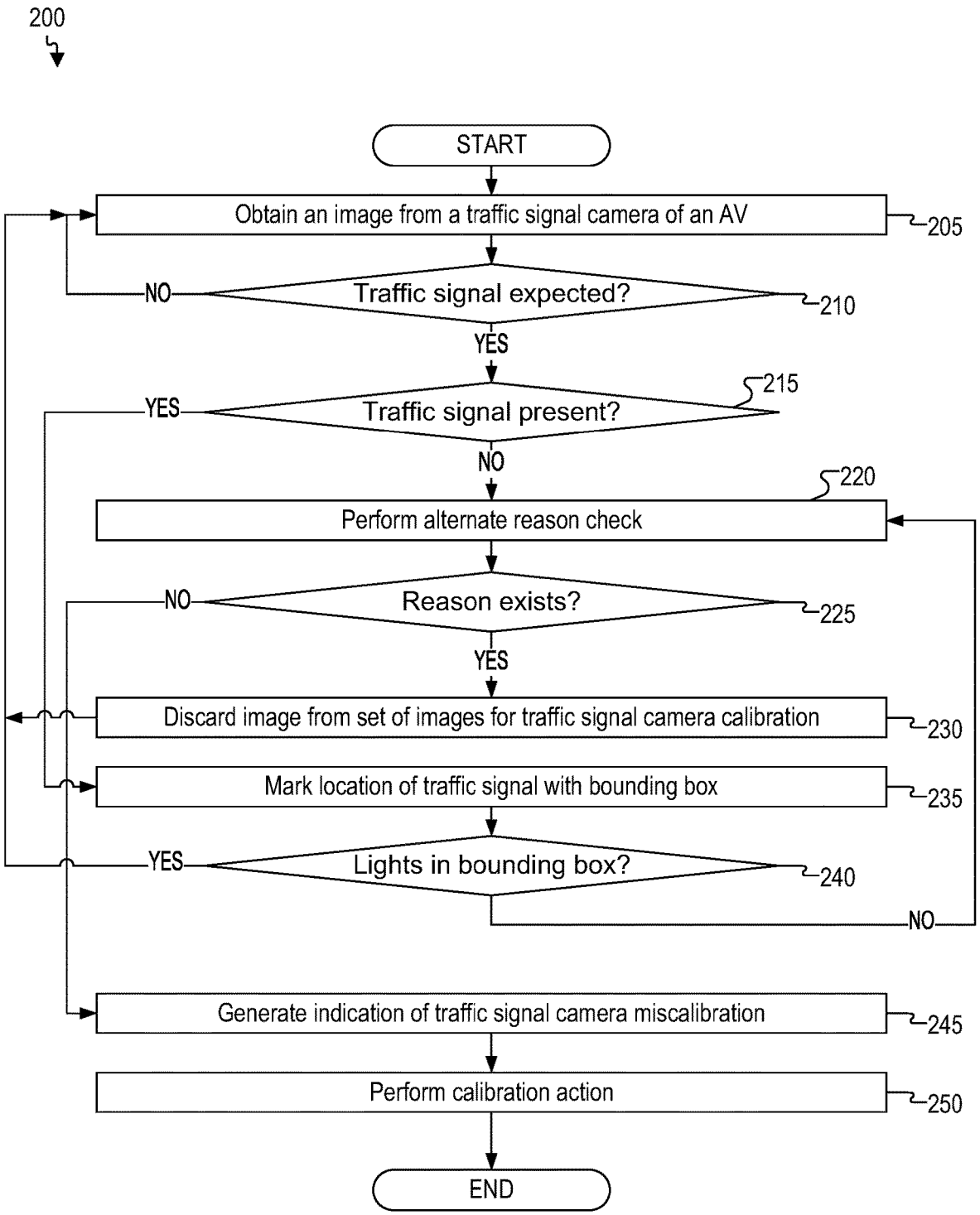
FIG. 2 is a flowchart of a method for detecting miscalibration of traffic signal cameras of autonomous vehicles (AVs) in accordance with some aspects of the present technology.

FIG. 2 illustrates an example method 200 for performing calibration checks for traffic signal cameras of an AV. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some of embodiments, the method 200 includes obtaining an image using a traffic signal camera of an AV at step 205. For example, the perception stack 112 illustrated in FIG. 1 may obtain an image from a traffic signal camera of an AV. In one or more embodiments, the image is an underexposed image. In one or more embodiments, an underexposed image is an image that is relatively dark, such that many items in an image are less clear, while light sources in the image are more prominently discernable. In one or more embodiments, the traffic signal camera is part of a sensor system of the AV (e.g., sensor system 104 shown in FIG. 1). In one or more embodiments, the image is a representation of an environment in front of an AV.

According to some embodiments, the method 200 includes making a determination as to whether a traffic signal is expected in the image at step 210. For example, the local computing device 110 illustrated in FIG. 1 may determine whether a traffic signal is expected to appear in the image. In one or more embodiments, any technique for determining whether an image from a traffic signal camera should include one or more traffic signals may be used. As an example, map data available to the local computing device 110 illustrated in FIG. 1 may be used to determine whether an image of a particular intersection should include one or more traffic signals. In one or more embodiments, if no traffic signal is expected to appear in the image, the method returns to step 205. In one or more embodiments, if a traffic signal is expected to appear in the image, the method proceeds to step 215.

According to some embodiments, the method 200 includes making a determination as to whether the image includes the expected one or more traffic signals at step 215. For example, the perception stack 112 illustrated in FIG. 1 may process the image to determine whether the image includes the expected one or more traffic signals. As an example, the image, or any portion thereof, may be used as input to a machine learning model for object identification in order to identify whether the image includes the expected one or more traffic signals. Other techniques for object identification in images may be used without departing from the scope of embodiments described herein. In one or more embodiments, if the expected one or more traffic signals do appear in the image, the method proceeds to step 235. In one or more embodiments, if the expected one or more traffic lights do not appear in the image, the method proceeds to step 220.

According to some embodiments, the method 200 includes performing an alternate reason check at step 220. For example, the local computing device 110 illustrated in FIG. 1 may perform an alternate reason check. In one or more embodiments, an alternate reason check is a determination of whether an alternate reason exists for why an expected one or more traffic signals do not appear in an image and/or, if a prior determination has been made that such traffic signals do exist, a determination of whether an alternate reason exists why one or more light sources of the one or more traffic signals are outside bounding boxes associated with the one or more traffic signals (see discussion of bounding boxes in the description of step 235, below). Any number of possible reasons may exist as to whether an expected one or more traffic signals may not appear in an image. As an example, a large truck may exist between the AV and an expected traffic signal. In such a scenario, the AV may use an image from an object camera of the AV of the same environment as the image from the traffic signal camera in order to determine the presence of the large truck that is occluding the traffic signal from the perspective of the traffic signal camera. Additionally, any number of reasons may exist as to why traffic signal light sources (e.g., light bulbs) may be outside a bounding box associated with a traffic light. Such alternate reasons include, but are not limited to: the light source being occluded (e.g., by a passing flying object); the distance between the traffic signal and the traffic signal camera being outside a predetermined distance range (e.g., too close or too far away); and the orientation of the traffic signal relative to the traffic signal camera (e.g., the traffic signal is perpendicular to the intersection the AV is approaching rather than facing the AV).

According to some embodiments, the method 200 includes determining, based on the alternate reason check performed in step 220, whether an alternate reason exists for either an expected traffic signal not appearing in an image or whether an alternate reason exists for a light source of a traffic signal appearing outside a bounding box associated with the traffic signal at step 225. For example, the local computing device 110 illustrated in FIG. 1 may determine whether an alternate reason exists. In one or more embodiments, if an alternate reason exists, the method proceeds to step 230, where the image is discarded from a set of images used for traffic signal camera calibration checks, and then returns to step 205. In one or more embodiments, if an alternate reason does not exist, the method proceeds to step 245.

According to some embodiments, the method 200 includes, based on a determination in step 215 that an expected traffic signal appears in the image, marking the location of the traffic signal in the image with a bounding box at step 235. For example, the perception stack 112 illustrated in FIG. 1 may add a bounding box indicating the location of the traffic signal in the image. In one or more embodiments, a bounding box is an area of any shape surrounding a traffic signal in an image obtained via a traffic signal camera of an AV. In one or more embodiments, the bounding box defines the AVs perceived location of the traffic signal. Any technique for adding a bounding box around a traffic signal may be used without departing from the scope of embodiments described herein. For example, the image, or any portion thereof, may be provided as an input to a machine learning model trained to identify objects in images. The output of such a machine learning model may include the bounding box added to the image around the traffic signal, a semantic label associated with the bounding box identifying the object within as a traffic signal, etc.

According to some embodiments, the method 200 includes making a determination as to whether light sources (e.g., light bulbs) of a traffic signal are within the bounding box associated with the traffic signal at step 240. For example, the local computing device 110 illustrated in FIG. 1 may determine whether a light source of a traffic signal is within a bounding box associated with the traffic signal. In one or more embodiments, if the light source is within the bounding box associated with the traffic signal, the traffic signal camera may be considered acceptably calibrated, and the method returns to step 205. In one or more embodiments, if the one or more light sources of the traffic light are not within the bounding box, the method proceeds to step 220 to perform an alternate reason check to determine whether an alternate reason exists for the light source to not be within the bounding box (e.g., outside the bounding box or not present in the image at all).

According to some embodiments, the method 200 includes generating an indication of traffic signal miscalibration at step 245. For example, the local computing device 110 may generate an indication of traffic signal miscalibration. In one or more embodiments, the indication of traffic signal miscalibration is generated based on a determination that a traffic signal was expected to appear in an image obtained by a traffic signal camera of an AV, but did not, and no alternate reason existed for the traffic signal not appearing in the image. In one or more embodiments, the indication of traffic signal miscalibration is generated based on one or more light sources of a traffic signal appearing outside a bounding box associated with the traffic signal, and no alternate reason exists for the light source(s) appearing outside the bounding box. The indication may be generated and provided to a relevant entity. For example, the indication may be transmitted to a stack (e.g., the control stack 122 illustrated in FIG. 1) so that the miscalibration of the traffic signal camera can be assessed to determine an appropriate response for the AV to perform. In one or more embodiments, the indication is generated after a single instance of a traffic light being determined to be miscalibrated. Additionally or alternatively, though not shown in FIG. 2, there may be a miscalibration quantity threshold, and the indication may be generated only when the number of detected miscalibrations meets or exceeds the threshold. For example, data may be collected and held for fifteen traffic signals at a time (i.e., the last fifteen traffic signals seen), and if the percentage of traffic signals for which the camera seems miscalibrated is at or above 70% of the fifteen, then the indication of traffic signal miscalibration is generated.

According to some embodiments, the method 200 includes performing a calibration action at step 250. For example, the local computing device 110 illustrated in FIG. 1 may perform a calibration action. A calibration action may include, but is not limited to: initiating a safe stop procedure for the AV; causing the AV to exit a fully autonomous driving mode (e.g., returning at least some control to another entity such as a passenger); initiating a real-time recalibration of the traffic signal camera while the AV continues to operate; reporting the miscalibration to a relevant entity; or any combination of such action. Although FIG. 2 shows the method 200 ending after step 250, the method 200 may instead continuously be performed when the AV is operating.

Additionally, although not shown in FIG. 2, the image may be used by any of the stacks 112-118 of the local computing device 110 of the AV for any number of purposes. As an example, the local computing device may discern the color of light being projected from a light source (e.g., a light bulb) based on the image, and determine whether the color is being accurately represented (i.e., the camera has accurate color tuning). A traffic signal camera misrepresenting the color of traffic signal lights may be considered a further form of miscalibration for which a response is required in order to allow the AV to operate properly.

Figure 3:
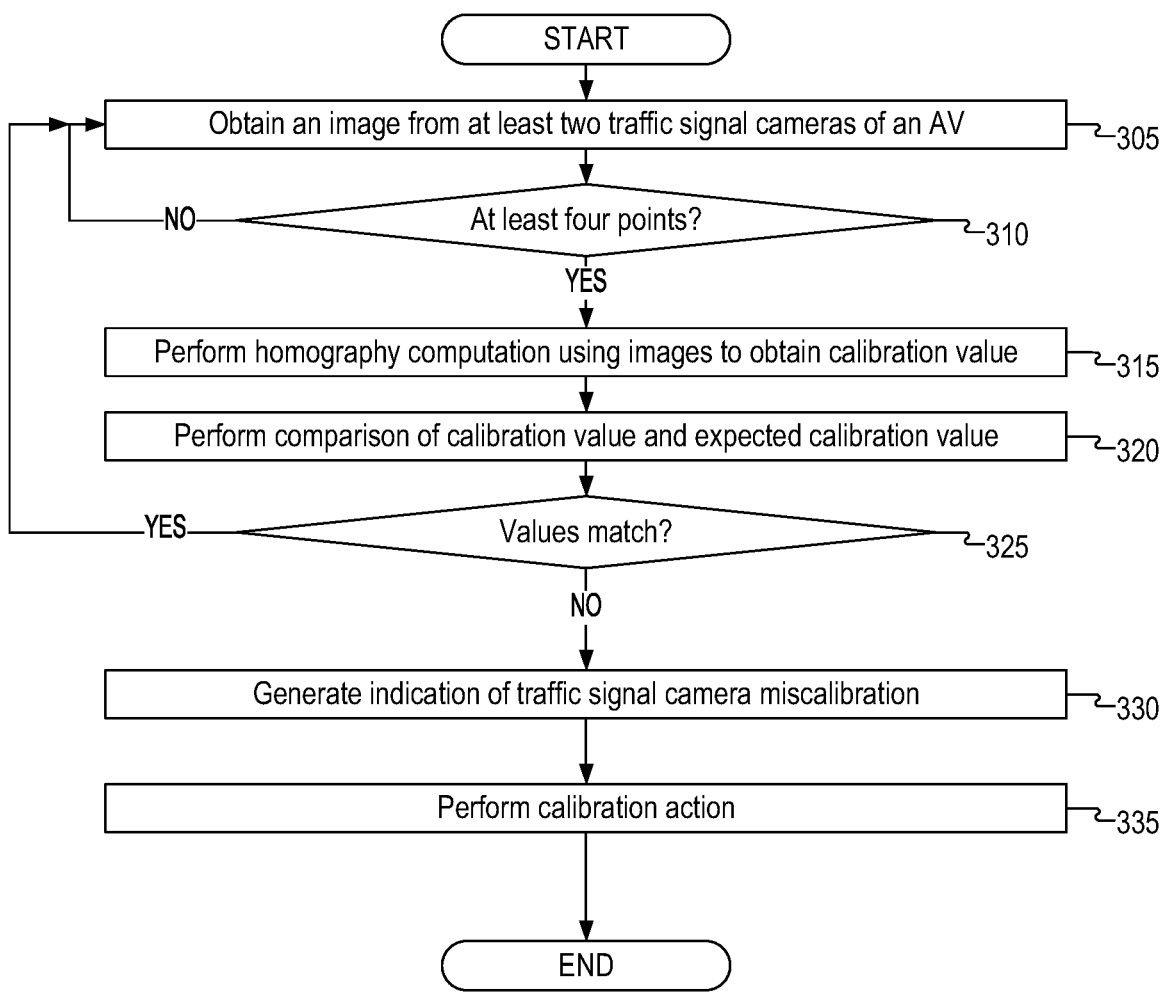
FIG. 3 is a flowchart of a method for detecting miscalibration of traffic signal cameras of autonomous vehicles (AVs) in accordance with some aspects of the present technology.

FIG. 3 illustrates an example method 300 for performing a calibration check for at least two traffic signal cameras of an AV. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method 300 includes obtaining from at least two traffic signal cameras of an AV at step 305. For example, the perception stack 112 illustrated in FIG. 1 may obtain an image from at least two traffic signal cameras of an AV. In one or more embodiments, the images each depict the same environment scene in front of the AV from the respective perspectives of the at least two traffic signal cameras. In one or more embodiments, the images are underexposed images such that light sources in the image are more clearly discernable than other objects in the images.

According to some embodiments, the method includes determining whether each of the two images obtained in step 305 include at least four light sources at step 310. For example, the local computing device 110 illustrated in FIG. 1 may determine whether each of the two images include at least four light sources. In one or more embodiments, each of the images is a two dimensional representation of the same three dimensional environment in front of the AV at a particular time. As such, the image may be considered as two dimensional planes. Accordingly, light sources I the images may be considered points in the planes, and the points in one plane correspond to points in the plane of the other image. For example, four light sources from traffic lights in one image should correspond to the same four light sources appearing the other image. In one or more embodiments, at least four points corresponding points must appear in each image for a useful homographic calculation to be performed. In one or more embodiments, if the images do not each include four corresponding points, the method 200 returns to step 305 to obtain new images from traffic signal cameras of the AV. In one or more embodiments, if each of the images include four corresponding points, the method 200 proceeds to step 315.

According to some embodiments, the method 200 includes performing a homography computation using the at least two images to obtain a calibration value comprising rotation information and translation information between the traffic signal cameras from which the images were obtained at step 315. For example, the local computing device 110 illustrated in FIG. 1 may perform a homography computation using the at least two images to obtain a calibration value comprising rotation information and translation information between the traffic signal cameras from which the images were obtained. In one or more embodiments, a homography computation includes using the locations of the at least four corresponding points along with a homography matrix to discern the relative rotation and translation between two traffic signal cameras of the AV. In one or more embodiments, a calibration value is a representative value that includes at least the rotation and translation information, and may be represented in any suitable form (e.g., a signal number, a set of numbers, etc.).

According to some embodiments, the method 200 includes performing a comparison of the calibration value obtained in step 315 and an expected calibration value for the AV at step 320. For example, the local computing device 110 illustrated in FIG. 1 may perform a comparison of the calibration value obtained in step 315 and an expected calibration value for the AV. In one or more embodiments, an expected calibration value is a representative value that includes an expected relative rotation and translation between two traffic signal cameras of the AV. In one or more embodiments, performing the comparison between the calibration value and the expected calibration value includes determining a difference, if any, between the two values.

According to some embodiments, the method 300 includes determining whether the calibration value and the expected calibration value match at step 325. For example, the local computing device 110 illustrated in FIG. 1 may determine whether the calibration value and the expected calibration value match. In one or more embodiments, match, as used herein, means an exact match. In other embodiments, match means that the two values are within a predetermined threshold amount from one another. In one or more embodiments, if the values match, the traffic signal cameras are acceptably calibrated with respect to one another, and the method 200 returns to step 305. In one or more embodiments, if the values do not match, the traffic signal cameras are miscalibrated relative to one another, and the method proceeds to step 330.

According to some embodiments, the method 300 includes generating an indication of traffic signal miscalibration at step 330. For example, the local computing device 110 may generate an indication of traffic signal miscalibration. In one or more embodiments, the indication of traffic signal miscalibration is generated based on a determination that the calibration value representing the relative rotation and translation between two traffic signal cameras does not match an expected calibration value for the two cameras. The indication may be generated and provided to a relevant entity. For example, the indication may be transmitted to a stack (e.g., the control stack 122 illustrated in FIG. 1) so that the miscalibration of the traffic signal camera can be assessed to determine an appropriate response for the AV to perform. In one or more embodiments, the indication is generated after a single instance of a traffic light being determined to be miscalibrated. Additionally or alternatively, though not shown in FIG. 3, there may be a miscalibration quantity threshold, and the indication may be generated only when the number of detected miscalibrations meets or exceeds the threshold.

According to some embodiments, the method 300 includes performing a calibration action at step 335. For example, the local computing device 110 illustrated in FIG. 1 may perform a calibration action. A calibration action may include, but is not limited to: initiating a safe stop procedure for the AV; causing the AV to exit a fully autonomous driving mode (e.g., returning at least some control to another entity such as a passenger); initiating a real-time recalibration of the traffic signal camera while the AV continues to operate; reporting the miscalibration to a relevant entity; or any combination of such actions. Although FIG. 3 shows the method 300 ending after step 335, the method 300 may instead continuously be performed when the AV is operating.

In one or more embodiments, the method 300 is performed while the AV navigates on public and/or private roadways, highways, streets, etc. Additionally, the method 300 may be performed in a special purpose garage configured, at least in part, for calibrating various components of the AV, including the cameras. For example, an AV may be navigated into such a garage where traffic signals or other light sources are installed that meet the requirements needed to perform the calibration technique of the method 300.

Figure 4:
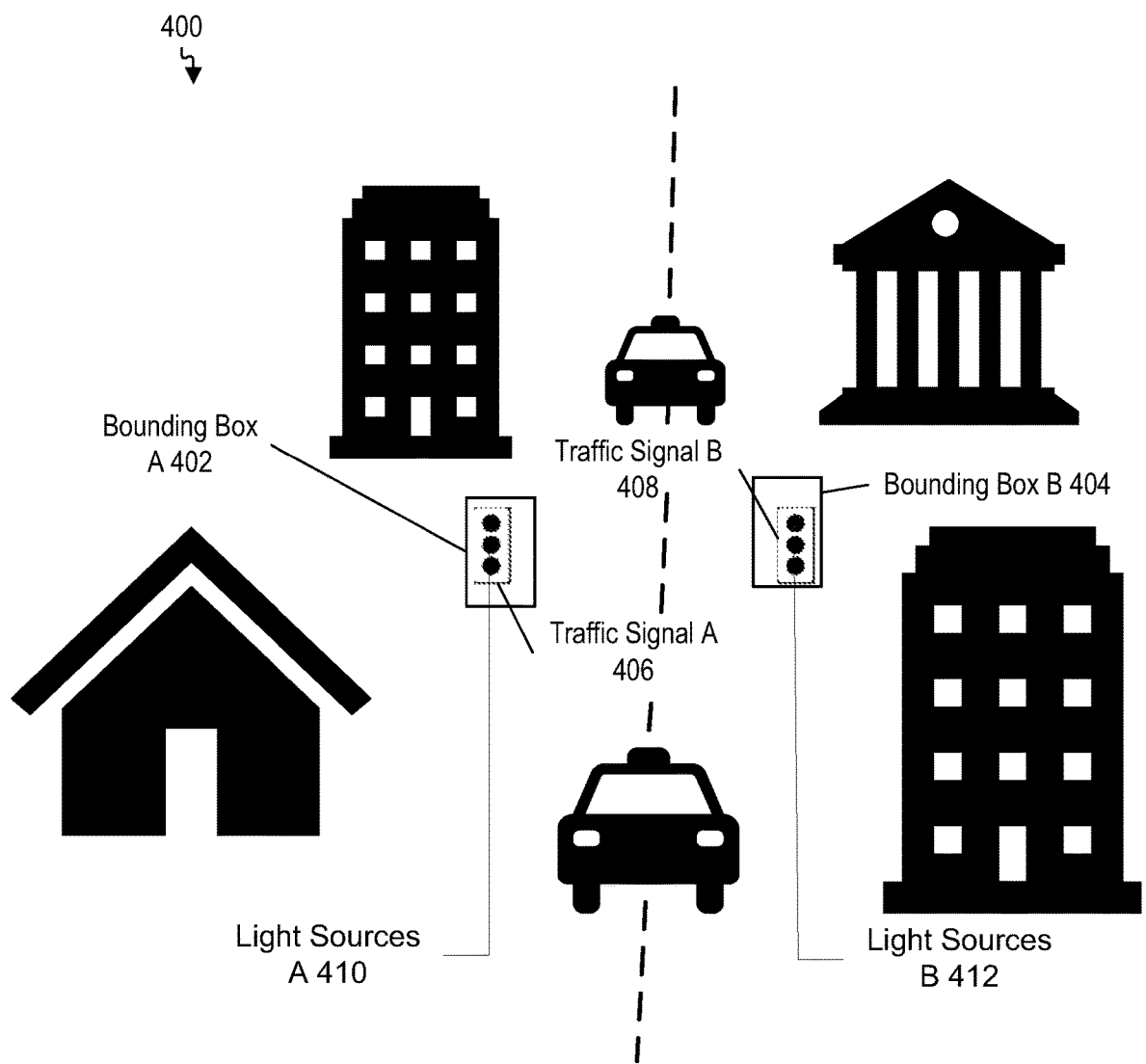
FIG. 4 shows an example of an image obtained from a traffic signal camera of an AV in accordance with some aspects of the present technology.
Figure 5:
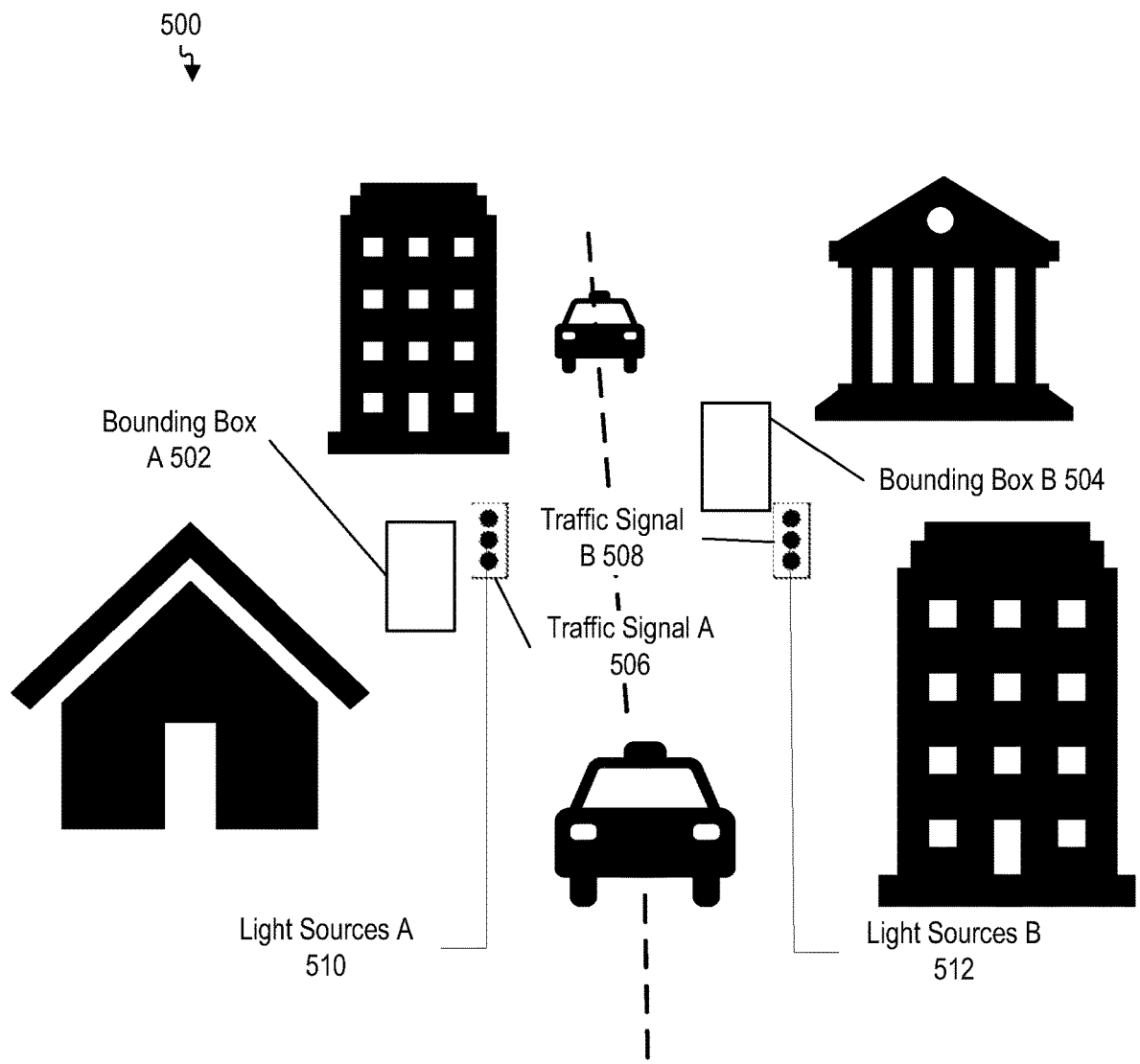
FIG. 5 shows an example of an image obtained from a traffic signal camera of an AV in accordance with some aspects of the present technology.

FIG. 4 and FIG. 5 show representative examples of images obtained from a traffic signal camera of an AV in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 4, consider a scenario in which an AV is autonomously navigating down a street. An intersection of the street includes two traffic signals, traffic signal A 406 and traffic signal B 408. In this scenario, a traffic signal camera of the AV (not shown) captures the image 400 shown in FIG. 4. The image is obtained by a perception stack (not shown) of the AV, which processes the image to identify traffic signals in the image, and mark the location of the traffic signals with bounding boxes. In this example, the perception stack correctly marks traffic signal A 406 with bounding box A 402, and marks traffic signal B 408 with bounding box B 404. In this scenario, a local computing device (not shown) of the AV makes a determination that the light sources A 410 are within bounding box A 402, and that the light sources B 412 are within the bounding box B 404. Thus, the AV determines that, at this time, the traffic signal camera that captured image 400 is acceptably calibrated.

Now referring to FIG. 5, consider a scenario in which an AV is autonomously navigating down a street sometime later than when the image 400 of FIG. 4 was obtained. An intersection of the street again includes two traffic signals, traffic signal A 506 and traffic signal B 508. In this scenario, a traffic signal camera of the AV (not shown) captures the image 500 shown in FIG. 5. The image is obtained by a perception stack (not shown) of the AV, which processes the image to identify traffic signals in the image, and mark the location of the traffic signals with bounding boxes. In this example, the perception stack marks the image 500 with bounding box A 502 and bounding box B 504 at locations where the traffic signals are perceived to be located. However, as shown in FIG. 5, in this instance, the traffic signals 506 and 508 are slightly offset from the respective bounding boxes 502 and 504. Accordingly, when the AV determines whether the light sources 510 and 512 are within the bounding boxes 502 and 504, the determination is that they are not. Therefore, the traffic signal camera of the AV might be miscalibrated.

However, before making such a determination, the AV performs an alternate reason check to determine if an alternate reason exists for the light sources 510 and 512 to be outside the bounding boxes 502 and 504. However, the AV determines that the light sources are not occluded using an image of the same environment scene from an object camera of the AV. The AV also determines that the distance between the traffic signals and the AV is within the appropriate distance range, and that the orientation of the traffic signals should not cause the light sources to be outside the bounding boxes. Thus, in this scenario, no alternate reason exists for the light sources 510 and 512 to be outside the bounding boxes 502 and 504. Therefore, the AV generates an indication that the traffic signal camera that captured the image 500 is miscalibrated. The indication is provided to a control stack of the AV, which performs the calibration of action of initiating a safe stop procedure to safely bring the AV to a stop. Once the AV is safely stopped, the miscalibrated traffic signal camera is recalibrated before the AV resumes autonomous navigation.

Figure 6:
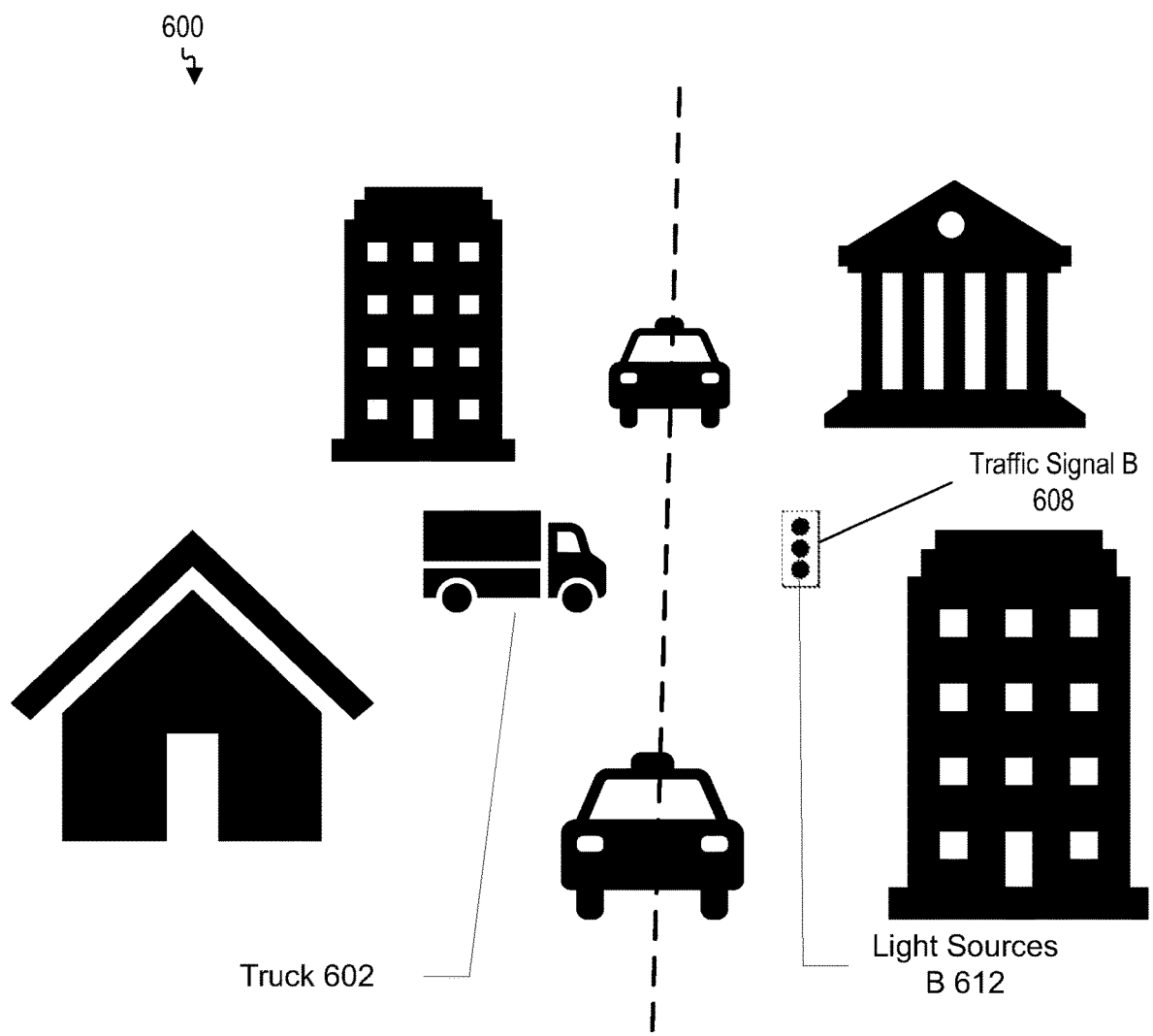
FIG. 6 shows an example of an image obtained from an object camera of an AV in accordance with some aspects of the present technology.

FIG. 6 shows a representative example of an image obtained from an object camera of an AV in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 6, consider a scenario in which an AV is autonomously navigating down a street. An intersection of the street includes two traffic signals, which the AV determines using map data available to the local computing device of the AV. In this scenario, when the perception stack of the AV obtains an image from a traffic signal camera of the AV. However, the perception stack determines that the image from the traffic signal camera only has one traffic signal rather than the expected two traffic signals. Therefore, the local computing device of the AV performs an alternate reason check to determine of an alternate reason exists for why the expected quantity of traffic signals are not in the image from the traffic signal camera. However, as the image from the traffic signal camera is intentionally underexposed to make any light sources more clearly discernable, the local computing device obtains the image 600 from an object camera of the AV, as shown in FIG. 6. The image 600 has been processed by the perception stack of the AV, and semantically labeled the truck 602 in the image. The local computing device of the AV determines that the location of the truck in the image 600 indicates that the truck is occluding an expected traffic signal, which is why the signal does not appear in the image obtained from the traffic signal camera. Thus, an alternate reason exists as to why the expected number of traffic signals do not appear in the image from the traffic signal camera. Accordingly, the image from the traffic signal camera is discarded from a set of images used to determine whether the traffic signal camera is miscalibrated.

Figure 7:
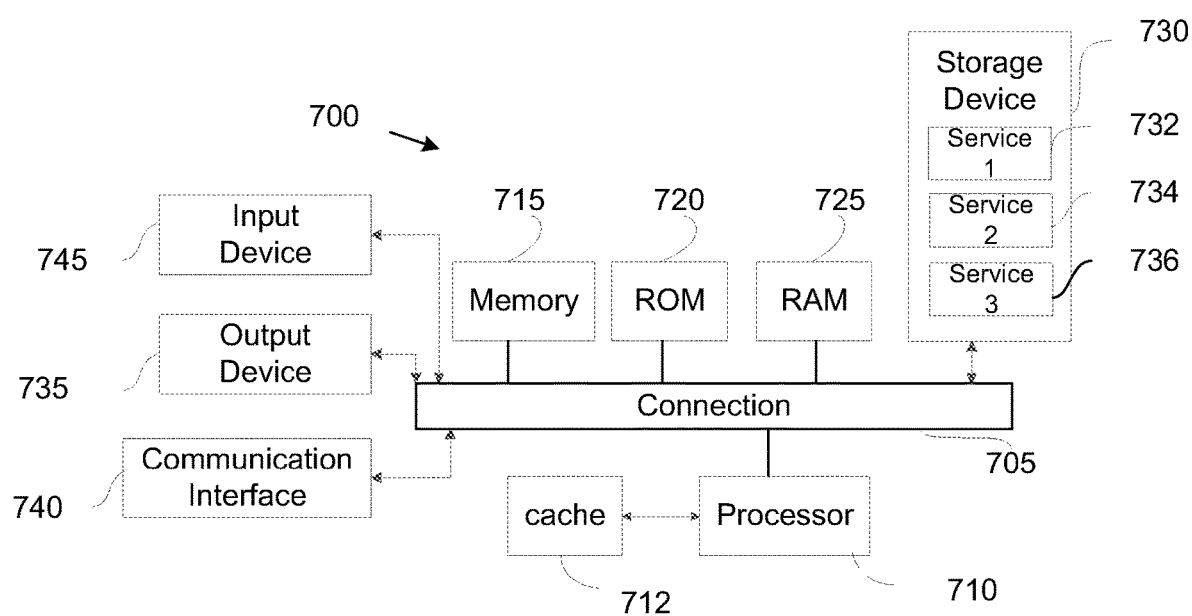
FIG. 7 shows an example of a system for implementing certain aspects of the present technology.

FIG. 7 shows an example of computing system 700, which can be for example any computing device making up the local computing device 110 of FIG. 1, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for performing calibration checks for traffic signal cameras of autonomous vehicles (AVs), the method comprising:
    obtaining an image using a traffic signal camera of an AV;
    marking a location of a traffic signal in the image with a bounding box;
    making a determination that a light source corresponding to the traffic signal is not within the bounding box;
    performing an alternate reason check to determine whether an alternate reason exists for the light source to not be within the bounding box;
    generating an indication that the traffic signal camera is miscalibrated when the alternate reason does not exist, wherein the image is underexposed and comprises at least four light sources;
    obtaining a second image using a second traffic signal camera of the AV, wherein the second image also includes the at least four light sources;
    performing a homography computation using the image and the second image to obtain a calibration value comprising rotation information and translation information between the traffic signal camera and the second traffic signal camera;
    performing a comparison of the calibration value the calibration value and an expected calibration value for the AV; and
    performing a calibration action based on the comparison, wherein the calibration action comprises causing the AV to exit a fully autonomous mode when the comparison yields a difference between the calibration value and the expected calibration value.

2. The method of claim 1, further comprising performing a calibration action based on the indication.

3. The method of claim 1, wherein, when the alternate reason does exist, the method further comprises excluding the image from a set of images for traffic signal camera miscalibration detection.

4. The method of claim 3, wherein the alternate reason check comprises determining if the traffic signal is occluded.

5. The method of claim 4, wherein determining if the traffic signal is occluded comprises using image data from an object camera of the AV.

6. The method of claim 3, wherein the alternate reason check comprises determining if a distance from the AV to the traffic signal is within a predetermined distance range.

7. The method of claim 3, wherein the alternate reason check comprises determining an orientation of the traffic signal camera relative to the AV.

8. The method of claim 1, wherein the image is an underexposed image.

9. The method of claim 1, wherein the indication is generated after a detected miscalibration quantity threshold is reached.

10. The method of claim 1, wherein, based on the indication, a safe stop procedure is initiated for the AV.

11. The method of claim 1, further comprising using the image and the light source of the image to determine whether a color tuning of the traffic signal camera is accurate.

12. The method of claim 1, further comprising:
obtaining a second image using the traffic signal camera, wherein additional environment data indicates that the second image should include a second traffic signal;
determining that the second image does not include the second traffic signal;
performing the alternate reason check to determine that there is an alternate reason for the second image not including the second traffic signal; and
discarding the second image from a set of images for traffic signal camera calibration.

13. A non-transitory computer readable medium comprising instructions, the instructions, when executed by a computing system, cause the computing system to:
obtain an image using a traffic signal camera of an AV;
mark a location of a traffic signal in the image with a bounding box;
make a determination that a light source corresponding to the traffic signal is not within the bounding box;
perform an alternate reason check to determine whether an alternate reason exists for the light source to not be within the bounding box;
generate an indication that the traffic signal camera is miscalibrated when the alternate reason does not exist, wherein the image is underexposed and comprises at least four light sources;
obtain a second image using a second traffic signal camera of the AV, wherein the second image also includes the at least four light sources;
perform a homography computation using the image and the second image to obtain a calibration value comprising rotation information and translation information between the traffic signal camera and the second traffic signal camera;
perform a comparison of the calibration value the calibration value and an expected calibration value for the AV; and
perform a calibration action based on the comparison, wherein the calibration action comprises performing a relative recalibration of the traffic signal camera and the second traffic signal camera.

14. The non-transitory computer readable medium of claim 13, wherein the non-transitory computer readable medium further comprises instructions that, when executed by the computing system, cause the computing system to perform a calibration action based on the indication.

15. A system for performing calibration checks for traffic signal cameras of autonomous vehicles (AVs), comprising:
a storage configured to store instructions; and
a processor configured to execute the instructions and cause the processor to:
obtain an image using a traffic signal camera of an AV;
mark a location of a traffic signal in the image with a bounding box;
make a determination that a light source corresponding to the traffic signal is not within the bounding box;
perform an alternate reason check to determine whether an alternate reason exists for the light source to not be within the bounding box; and
generate an indication that the traffic signal camera is miscalibrated when the alternate reason does not exist, wherein the image is underexposed and comprises at least four light sources;
obtain a second image using a second traffic signal camera of the AV, wherein the second image also includes the at least four light sources;
perform a homography computation using the image and the second image to obtain a calibration value comprising rotation information and translation information between the traffic signal camera and the second traffic signal camera;
perform a comparison of the calibration value the calibration value and an expected calibration value for the AV; and
perform a calibration action based on the comparison, wherein the calibration action comprises causing the AV to exit a fully autonomous mode when the comparison yields a difference between the calibration value and the expected calibration value.

* * * * *